United States Patent [19]

Kurohara et al.

[11] Patent Number: 5,410,865
[45] Date of Patent: May 2, 1995

[54] MID-MOUNT TYPE RIDING LAWN TRACTOR

[75] Inventors: Kazuaki Kurohara; Hiroyuki Ogasawara, both of Sakai, Japan

[73] Assignee: Kubota Corporation, Japan

[21] Appl. No.: 246,818

[22] Filed: May 20, 1994

[30] Foreign Application Priority Data

Sep. 30, 1993 [JP] Japan ................. 5-244042

[51] Int. Cl.6 ............... A01D 34/64; A01D 34/74; A01D 67/00
[52] U.S. Cl. ..................... 56/15.9; 56/17.1; 56/DIG. 22
[58] Field of Search .......... 56/15.9, 15.8, DIG. 22, 56/17.1

[56] References Cited

U.S. PATENT DOCUMENTS

| | | | |
|---|---|---|---|
| 2,928,223 | 3/1960 | Danuser | 56/DIG. 22 |
| 3,283,486 | 11/1966 | Marek et al. | 56/DIG. 22 |
| 3,483,684 | 12/1969 | Price | 56/DIG. 22 |
| 3,654,749 | 4/1972 | Ostergren et al. | 56/DIG. 22 |
| 3,680,880 | 8/1972 | Blaauw | 280/43.17 |
| 4,120,136 | 10/1978 | Rose | 56/17.1 |
| 4,869,057 | 9/1989 | Siegrist | 56/15.9 |
| 5,351,467 | 10/1994 | Trefz et al. | 56/16.3 |

Primary Examiner—Stephen J. Novosad
Attorney, Agent, or Firm—Webb Ziesenheim Bruening Logsdon Orkin & Hanson

[57] ABSTRACT

A mid-mount type riding lawn tractor includes tractor frames, a mower unit disposed under the tractor frames, and a connection structure for vertically movably connecting the mower unit to the tractor frames. The connection structure includes support arms extending substantially longitudinally of the tractor frames, each of the support arms being pivotally connected at one end thereof to a lower position of one of the tractor frames, and at the other end to a portion of the mower unit, interlocking links each pivotally connected at one end thereof to a position of the mower unit closer than the portion of the mower unit to the position of connection between the support arm and the tractor frame, each of the interlocking links having a free end, and seesaw arms. Each seesaw arm has an intermediate connecting portion pivotally connected to an intermediate position of one of the support arms, a first arm portion extending in one direction from the intermediate connecting portion, the first arm portion being pivotally connected at a distal end thereof to the free end of the interlocking link, and a second arm portion extending in a different direction to the first arm portion from the intermediate connecting portion, the second arm portion having a contact for contacting one of the tractor frames from below.

12 Claims, 4 Drawing Sheets

MID-MOUNT TYPE RIDING LAWN TRACTOR

BACKGROUND OF THE INVENTION

1. Field of the Invention

The present invention relates to mid-mount type tiding lawn tractors, and more particularly to a structure for connecting a mower unit to tractor frames.

2. Description of the Related Art

One example of structure for connecting a mower unit to a tiding lawn tractor is disclosed in Japanese Utility Model Publication Kokai No. 63-26221.

This connection structure includes support arms extending rearward from lower forward positions of tractor frames to be vertically pivotable about a transverse axis. The support arms are connected at rear ends thereof to rearward positions of the mower unit. Forward positions of the mower unit are pivotally connected to the tractor frames through interconnected links, respectively. One of the links defines a slot for receiving a pin fixed to one of the support arms, so that this link is movable and pivotable relative to the support arm within a range provided by the slot. When the support arms are moved vertically, the mower unit makes a vertical parallel movement by action of the support arms and interconnected links. That is, according to the above structure, when the support arms are moved vertically, the pins of the support arms move within the slots formed in the links. The links are movable and pivotable relative to the support arms to absorb a difference between loci of movement of the supports arm and links.

However, in the structure in which the pins of the support arms move within the slots of the links, local wear is developed where the slots and pins contact each other after a long period of use. As a result, the pins become substantially inclined relative to the slots to cause a twist or jam, impairing movement of the pins in the slots.

Moreover, a riding lawn tractor scatters large quantities of grass clippings, soil and the like around the mower unit during an operation. Such grass clippings, soil and the like may enter the slots to increase the chance of twisting or jamming, thereby making a smooth vertical movement of the mower unit impossible.

SUMMARY OF THE INVENTION

An object of the present invention is to provide a mid-mount type riding lawn tractor having a connection structure for allowing a smooth vertical movement of the mower unit with a reduced chance of twisting or jamming.

The above object is fulfilled, according to the present invention, by a mid-mount type riding lawn tractor including tractor frames, a mower unit disposed under the tractor frames, support arms extending substantially longitudinally of the tractor frames for pivotally interconnecting lower positions of the tractor frames and a portion of the mower unit, interlocking link pivotally connected to a portion of the mower unit different from the portion to which the support arms are connected, and seesaw arms each having an intermediate portion pivotally connected to an intermediate position of one of the support arms, each seesaw arm having a first arm portion connected at an end thereof to a free end of one of the interlocking links, and a second arm portion with an end thereof contacting a lower position of one of the tractor frames.

The above connection structure according to the present invention will be described in relation to vertical movement of the mower unit in the embodiment.

It is assumed for example that, as shown in FIGS. 1 and 2, support arms 7 have a transverse axis P1 located in a lower forward position of tractor frames 3, with interlocking links 8 arranged in forward positions of a mower unit 6. In this case, rear positions of the mower unit 6 are supported by the support arms 7. The mower unit 6 is not permitted to pivot downward about the points of connection to the support arms 7, since seesaw arms 9 are prevented from pivoting clockwise in the drawings by contact between free ends of the seesaw arms 9 and stationary members 10 secured to the tractor flames 3. Consequently, the forward portion of the mower unit 6 is supported in a raised position.

When the driver carries out an operation to cause the support arms 7 through an interlocking link 15 to pivot upward to raise the mower unit 6, a transverse axis P3 of the support arms 7 as well as the seesaw arms 9 are raised, with the free ends of the seesaw arms 9 moving along the stationary members 10 of the tractor frames 3 leftward in the drawings. Thus, the seesaw arms 9 pivot counterclockwise in the drawings, raising the forward portion of the mower unit 6 connected to one end of each seesaw arm 9 through the interlocking link 8.

According to the present invention, as described above, the free ends of the seesaw arms 9 are biased only from below to the stationary members 10 of the tractor frames 3 regardless of vertical positions of the mower unit 6. The mower unit 6 may be maintained in a selected position without requiring a slot structure for limiting downward displacement of the free ends of the seesaw arms 9 from the stationary members 10 of the tractor frames 3. That is, regions below the stationary members 10 may be left as open spaces. Consequently, even when local wear occurs between the free ends of the seesaw arms 9 and lower surfaces of the stationary members 10, no twisting or jamming will take place therebetween. The free ends of the seesaw arms 9 are smoothly movable along the lower surfaces of the stationary members 10 at all times.

Thus, the structure according to the present invention for absorbing a difference between loci of movement of vertically moving portions of the mower unit is not a movement accommodating structure including pins and slots, which is vulnerable to twisting or jamming, but a contact structure with a pin biased in only one direction, i.e. having an open space below the pin. This structure enables the mower unit to move up and down smoothly at all times, thereby improving operability of the riding lawn tractor.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENTS

Embodiments of the present invention will be described with reference to the drawings.

Figure 1:
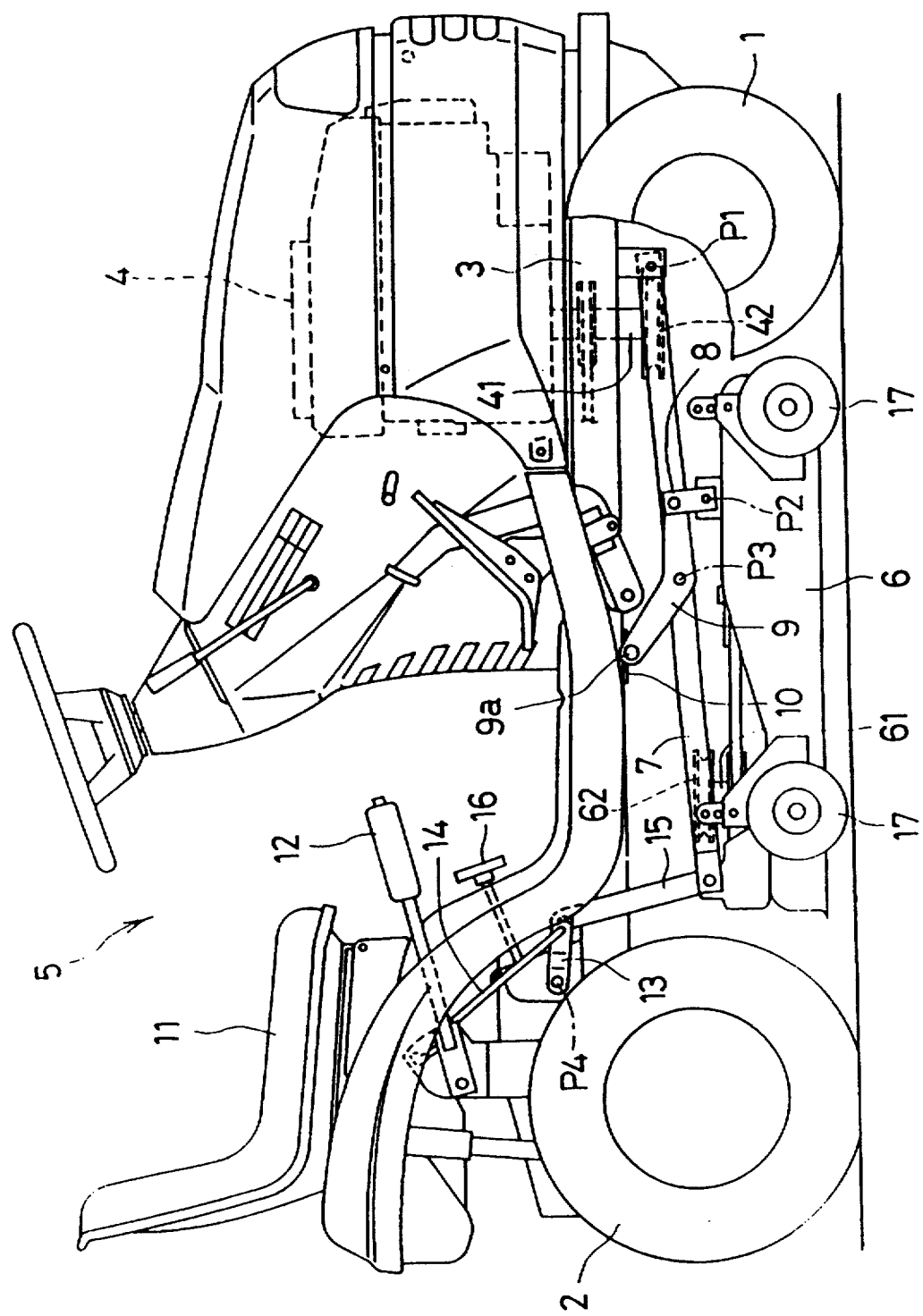
FIG. 1 is a side elevation of a riding lawn tractor according to the present invention.

As shown in FIG. 1, a riding lawn tractor has front wheels 1 and rear wheels 2 supporting tractor frames 3. The tractor frames 3 can), an engine 4 in a front region thereof, and a driver's section 5 in a rear region thereof. A mower unit 6 is disposed between front wheels 1 and rear wheels 2.

The engine 4 has an output shaft 41 projecting downward through a lower forward position of the tractor frames 3 and supporting an output pulley 42. The mower unit 6 has an input shaft 61 with an input pulley 62 projecting upward. The two pulleys 42 and 62 are connected by a driving belt 18 to drive the mower unit 6.

The mower unit 6 is suspended from the tractor frames 3 between front wheels 1 and rear wheels 2. A connection structure of the mower unit 6 will be described next.

Figures 2, 3:
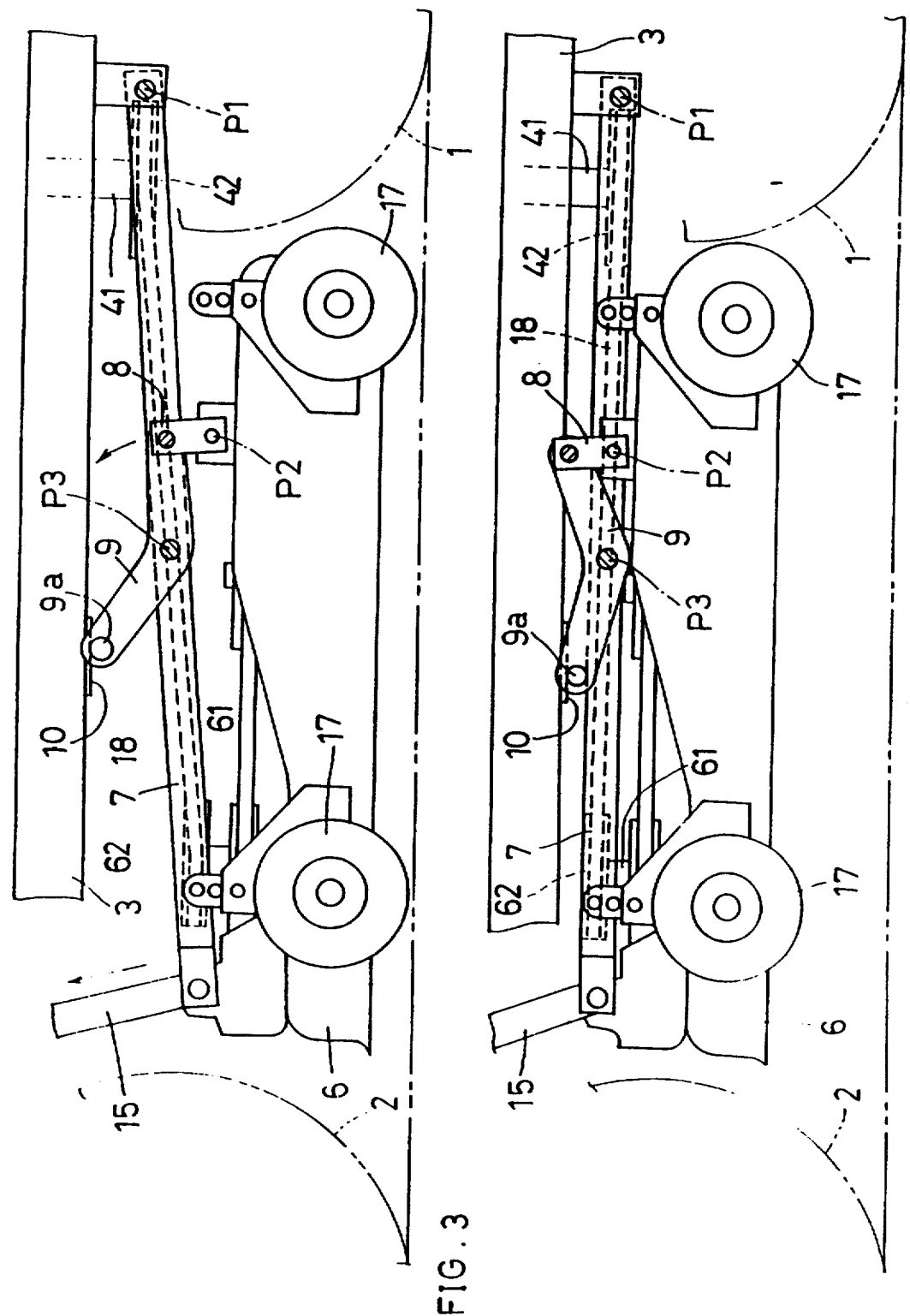
FIG. 2 is a side view of a mower unit in a lowermost position.
FIG. 3 is a side view of the mower unit in an uppermost position.

As shown in FIGS. 1 and 2, a pair of right and left support arms 7 extend rearward (toward the mower unit 6) from the tractor frames 3 to be vertically pivotable about a transverse axis P1 located in a lower forward position of the tractor frames 3 adjacent the output pulley 42. The support arms 7 are pivotally connected at rear ends thereof to rearward positions of the mower unit 6 adjacent the input pulley 62.

Interlocking links 8 are connected to forward positions of the mower unit 6 to be pivotable fore and aft about a transverse axis P2. Seesaw arms 9 are supported by the support arms 7 to be vertically pivotable about a transverse axis P3 located in an intermediate position thereof. One end of each seesaw arm 9 is pivotally connected to a free end of one interlocking link 8.

Figure 4:
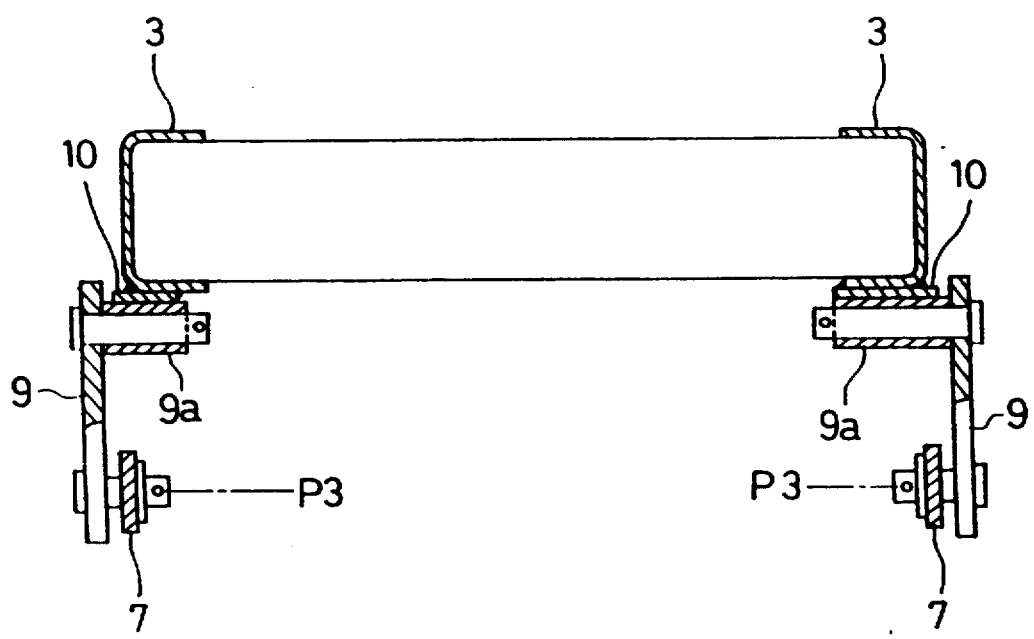
FIG. 4 is a fragmentary rear view in vertical section of support arms and tractor frames adjacent seesaw arms and support plates.

As shown in FIGS. 2 and 4, a support plate 10 is fixed to a lower position of each tractor frame 3. The support plate 10 has a lower surface coated with resin. The other end of each seesaw arm 9 has a roller 9a rotatably attached thereto. The roller 9a is placed in contact with the lower surface of the support plate 10 to be movable fore and aft.

As shown in FIG. 1, the driver's section 5 has a driver's seat 11, and a lever 12 disposed at the right side of the driver's seat 11 for raising and lowering the mower unit 6. The raising and lowering lever 12 is connected through an interlocking rod 14 to support arms 13 connected to the tractor frames 3 to be vertically pivotable about a transverse axis P4. Each support arm 13 has a free end thereof connected to the rear end of the support arm 7 through an interlocking link 15. A movement accommodating structure including a pin and a slot (not shown) is provided at a connection between the support arm 13 and interlocking link 15 to allow an upward movement of the interlocking link 15.

FIGS. 1 and 2 show the mower unit 6 lowered to a lowermost position by operating the raising and lowering lever 12. In this state, the rear portion of the mower unit 6 is suspended through the support arms 7 and interlocking links 15. The mower unit 6 is not permitted to pivot downward about the points of connection to the support arms 7. This is based on the action of the seesaw arms 9 supporting the forward portion of the mower unit 6. That is, the contact between the roller 9a of each seesaw arm 9 and the support plate 10 prevents the seesaw arm 9 from pivoting clockwise in the drawings.

When the raising and lowering lever 12 is operated to raise the mower unit 6 from the lowermost position, as shown in FIGS. 2 and 3, the interlocking links 15 pull up the support arms 7 which pivot about the transverse axis P1, thereby raising the rear portion of the mower unit 6. With this movement, the transverse axis P3 of the support arms 7 as well as the seesaw arms 9 are raised, with the rollers 9a rolling on the support plates 10 of the tractor frames 3 leftward in the drawings. Thus, the seesaw arms 9 pivot counterclockwise in the drawings, raising the forward portion of the mower unit 6. As shown in FIG. 3, the mower unit 6 may be locked to an uppermost position by locking the raising and lowering lever 12 to a corresponding uppermost position.

A retaining mechanism (not shown) is provided for holding, from below, the support arms 13 shown in FIG. 1 in a plurality of positions between the lowermost and uppermost positions of the mower unit 6. Thus, the mower unit 6 is adjustable to varied heights. FIG. 1 shows an adjusting dial 16 interlocked to the retaining mechanism.

As shown in FIG. 1, the mower unit 6 has four wheels 17 arranged in front and rear, right and left positions thereof for overriding obstacles. These wheels 17 do not contact the ground even when the mower unit 6 is brought to the lowermost position.

When the front wheels 17 run on a rock, stone or the like, the forward portion of the mower unit 6 is raised through a pivotal movement about the points of connection to the support arms 7. With this movement, the seesaw arms 9 pivot counterclockwise in the drawings. The rollers 9a of the seesaw arms 9 are freely movable downward from the support plates 10 of the tractor frames 3. Consequently, the forward portion of the mower unit 6 is raised with no resistance. When the rear wheels 17 run on a rock, stone or the like, the rear portion of the mower unit 6 is raised with no resistance, which is due to the movement accommodating structure at the connection between the support arms 13 and interlocking links 15. In this case, however, the front wheels 17 are automatically raised by contact between the rollers 9a of the seesaw arms 9 and the tractor frames 3.

As noted hereinbefore, the support arms 7 are connected to the tractor frames 3 adjacent the output pulley 42 of the engine 4, and to the mower unit 6 adjacent the input pulley 62. This arrangement provides an advantage that a distance between the two pulleys 42 and 62 hardly changes during vertical movement of the mower unit 6 relative to the tractor frames 3, and hence the belt 18 drivably connecting the pulleys 42 and 62 is maintained substantially in constant tension.

Figure 5:
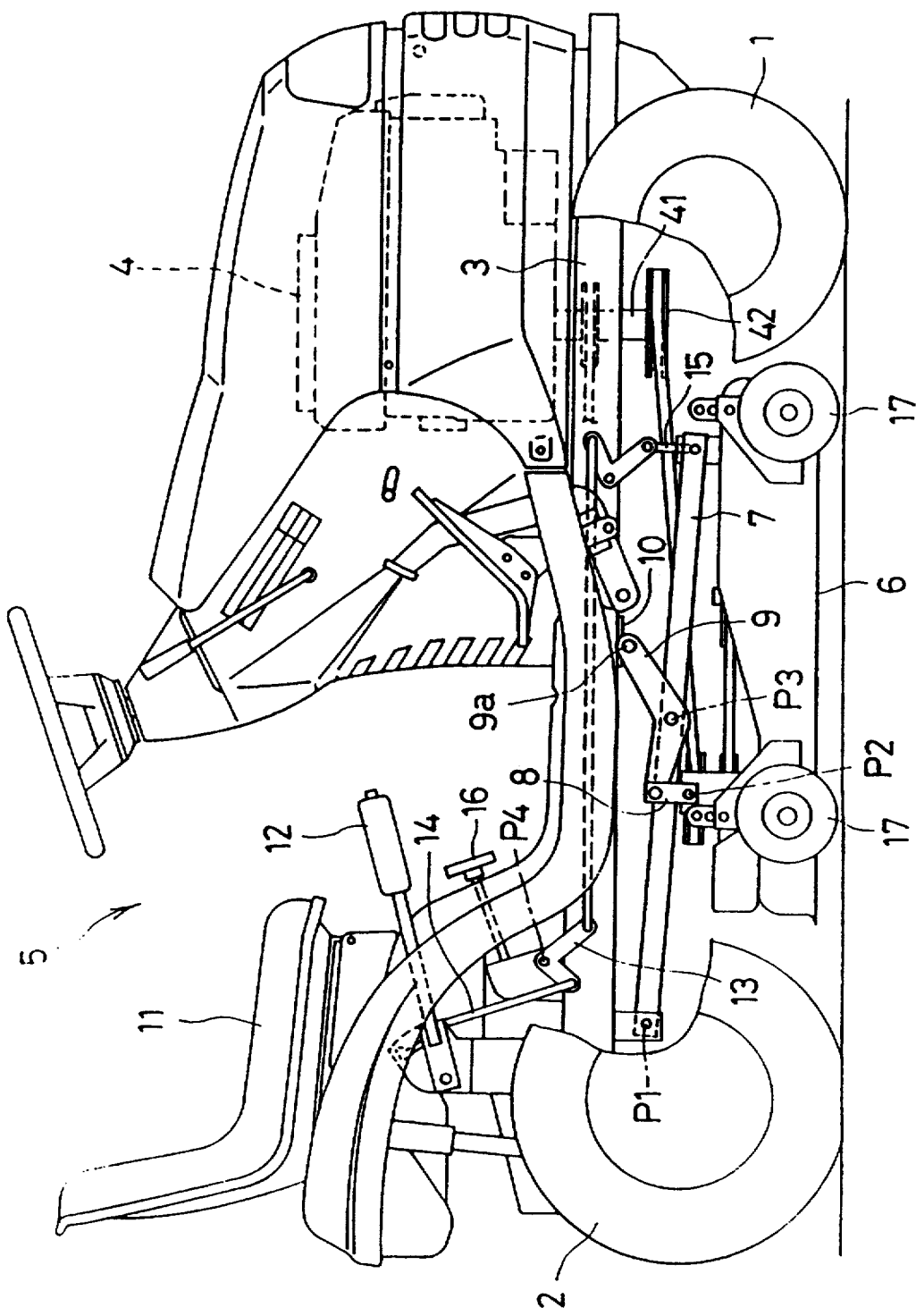
FIG. 5 is a view similar to FIG. 1 and showing a different embodiment of the invention in which support arms connecting the tractor frames and mower unit extend in an opposite direction to what is shown in FIG. 1.

In the embodiment shown in FIG. 1, the transverse axis P1 of the support arms 7 is located in a lower forward position of the tractor frames 3. As shown in FIG. 5, the support arms 7 may have a transverse axis P1 located in a lower rearward position of the tractor frames 3. In this case, the support arms 7 extend forward (toward the mower unit 6), with forward ends thereof pivotally connected to forward positions of the mower unit 6.

In the structure shown in FIG. 1, the transverse axis P3 is located in the support arms 7 rearwardly of the interlocking links 8. Alternatively, the transverse axis P3 may be located in the support arms 7 forwardly of the interlocking links 8, with the seesaw arms 9 pivotable about this transverse axis P3.

What is claimed is:

1. A mid-mount type tiding lawn tractor comprising:
   tractor frames;
   a mower unit disposed under said tractor frames; and
   connection means for vertically movably connecting said mower unit to said tractor frames, said connection means including:
   support arms extending substantially longitudinally of said tractor frames, each of said support arms being pivotally connected at one end thereof to a lower position of one of said tractor frames, and at the other end to a portion of said mower unit;
   interlocking links each pivotally connected at one end thereof to a position of said mower unit closer than said portion of said mower unit to the position of connection between said support arm and said tractor frame, each of said interlocking links having a free end; and
   seesaw arms each having:
   an intermediate connecting portion pivotally connected to an intermediate position of one of said support arms;
   a first arm portion extending in one direction from said intermediate connecting portion, said first arm portion being pivotally connected at a distal end thereof to said free end of said interlocking link; and
   a second arm portion extending in a different direction to said first arm portion from said intermediate connecting portion, said second arm portion having a contact for contacting one of said tractor frames from below.

2. A riding lawn tractor as defined in claim 1, wherein each of said tractor frames includes a contactable portion having a downwardly directed surface for receiving said contact of one of said seesaw arms.

3. A riding lawn tractor as defined in claim 1, wherein said mower unit remains substantially parallel to said tractor frames regardless of a vertical position of said mower unit relative to said tractor frames.

4. A riding lawn tractor as defined in claim 1, wherein said connection means includes raising and lowering means operable from a driver's seat on said lawn tractor for vertically moving said mower unit relative to said tractor frames.

5. A riding lawn tractor as defined in claim 4, wherein said raising and lowering means includes a control interlocking link pivotally connected to said mower unit, a raising and lowering lever disposed adjacent said driver's seat, and link means for connecting said control interlocking link and said raising and lowering lever.

6. A riding lawn tractor as defined in claim 5, wherein said link means includes a control support arm for connecting said control interlocking link and said tractor frames, and an interlocking rod for connecting said raising and lowering lever to a pivoting end of said control support arm.

7. A riding lawn tractor as defined in claim 6, wherein said raising and lowering means includes a retainer mechanism for retaining a posture of said control support arm, and adjusting means for varying a posture of said retainer mechanism.

8. A mid-mount type riding lawn tractor comprising:
   tractor frames;
   a mower unit disposed under said tractor frames; and
   connection means for vertically movably connecting said mower unit to said tractor frames, said connection means including:
   support arms extending substantially longitudinally of said tractor frames, each of said support arms being pivotally connected at one end thereof to a lower position of one of said tractor frames, and at the other end to a portion of said mower unit;
   interlocking links each pivotally connected at one end thereof to a position of said mower unit closer than said portion of said mower unit to the position of connection between said support arm and said tractor frame, each of said interlocking links having a free end;
   seesaw arms each having:
   an intermediate connecting portion pivotally connected to an intermediate position of one of said support arms;
   a first arm portion extending in one direction from said intermediate connecting portion, said first arm portion being pivotally connected at a distal end thereof to said free end of said interlocking link; and
   a second arm portion extending in a different direction to said first arm portion from said intermediate connecting portion, said second arm portion having a contact for contacting one of said tractor frames from below; and
   drive transmission means for transmitting output of an engine to said mower unit to rotate said mower unit, said drive transmission means including:
   an output member extending substantially downward from said engine adjacent said position of connection between said support arm and said tractor frame in side view of said lawn tractor;
   an input member extending substantially upward from said mower unit adjacent said position of connection between said support arm and said mower unit in side view of said lawn tractor; and
   connecting means for interconnecting said output member and said input member.

9. A riding lawn tractor as defined in claim 8, wherein said output member is an output pulley fixed to an output shaft of said engine, said input member is an input pulley fixed to an input shaft of said mower unit for receiving rotation of said output shaft, and said connecting means is a belt for interconnecting said output pulley and said input pulley, said belt having substantially the same length as one of said support arms in side view of the lawn tractor.

10. A riding lawn tractor as defined in claim 8, wherein said output member is an output pulley fixed to an output shaft of said engine, said input member is an input pulley fixed to an input shaft of said mower unit for receiving rotation of said output shaft, and said connecting means is a belt for interconnecting said output pulley and said input pulley, said belt extending substantially parallel to one of said support arms in side view of the lawn tractor.

11. A mid-mount type tiding lawn tractor comprising:

tractor frames;

a mower unit disposed under said tractor frames; and connection means for vertically movably connecting said mower unit to said tractor frames, said connection means including:

support arms extending substantially longitudinally of said tractor frames, each of said support arms being pivotally connected at one end thereof to a lower position of one of said tractor frames, and at the other end to a portion of said mower unit:

interlocking links each pivotally connected at one end thereof to a position of said mower unit closer than said portion of said mower unit to the position of connection between said support arm and said tractor frame, each of said interlocking links having a free end;

seesaw arms each having:

an intermediate connecting portion pivotally connected to an intermediate position of one of said support arms;

a first arm portion extending in one direction from said intermediate connecting portion, said first arm portion being pivotally connected at a distal end thereof to said free end of said interlocking link; and a second arm portion extending in a different direction to said first arm portion from said intermediate connecting portion, said second arm portion having a contact for contacting one of said tractor frames from below; and drive transmission means for transmitting output of an engine to said mower unit to rotate said mower unit, said drive transmission means including:

an output member extending substantially downward from said engine above and adjacent said position of connection between said support arm and said tractor frame in side view of said lawn tractor;

an input member extending substantially upward from said mower unit below and adjacent said position of connection between said support arm and said mower unit in side view of said lawn tractor; and connecting means for interconnecting said output member and said input member.

12. A riding lawn tractor as defined in claim 11, wherein said output member is an output pulley fixed to an output shaft of said engine, said input member is an input pulley fixed to an input shaft of said mower unit for receiving rotation of said output shaft, and said connecting means is a belt for interconnecting said output pulley and said input pulley, said belt having substantially the same length as one of said support arms in side view of the lawn tractor.

* * * * *

UNITED STATES PATENT AND TRADEMARK OFFICE
CERTIFICATE OF CORRECTION

PATENT NO. : 5,410,865
DATED : May 2, 1995
INVENTOR(S) : Kazuaki Kurohara and Hiroyuki Ogasawara It is certified that error appears in the above-indentified patent and that said Letters Patent is hereby corrected as shown below:

Column 1 Lines 6-7 "tiding" should read --riding--.

Column 1 Line 11 "tiding" should read --riding--.

Column 2 Line 17 "flames" should read --frames--.

Column 3 Line 16 "can)," should read --carry--.

Claim 1 Line 10 Column 5 "tiding" should read --riding--.

Claim 11 Line 68 Column 6 "tiding" should read --riding--.

Claim 11 Line 10 Column 7 "unit:" should read --unit;--.

Signed and Sealed this

Twenty-sixth Day of September, 1995

Attest:

BRUCE LEHMAN

Attesting Officer     Commissioner of Patents and Trademarks